US005736708A

United States Patent [19]

Delzenne

[11] Patent Number: 5,736,708

[45] Date of Patent: Apr. 7, 1998

[54] PLASMA TORCH HEAD WITH NOZZLE PROVIDING AN IMPROVED CUT AND PLASMA TORCH INCLUDING THE SAME

[75] Inventor: Michel Delzenne, Franconville, France

[73] Assignee: La Soudure Autogene Francaise, Paris Cedex, France

[21] Appl. No.: 665,987

[22] Filed: Jun. 19, 1996

[30] Foreign Application Priority Data

Jun. 23, 1995 [FR] France ........ 95 07608

[51] Int. Cl.[6] ........ B23K 10/00

[52] U.S. Cl. ........ 219/121.51; 219/121.5; 219/121.52; 219/75

[58] Field of Search ........ 219/121.39, 121.48, 219/121.51, 121.52, 121.59, 74, 75, 115, 121.5; 313/231.21, 231.31

[56] References Cited

U.S. PATENT DOCUMENTS

| | | | |
|---|---|---|---|
| 3,930,139 | 12/1975 | Bykhovsky et al. | 219/121.52 |
| 4,058,697 | 11/1977 | Bykhovsky et al. | 219/75 |
| 4,650,956 | 3/1987 | Marhic et al. | 219/121.52 |
| 4,769,524 | 9/1988 | Hardwick | 219/121.52 |
| 4,954,683 | 9/1990 | Hatch . | |
| 5,083,005 | 1/1992 | Degrigny | 219/121.52 |
| 5,440,094 | 8/1995 | Zapletal | 219/121.5 |

FOREIGN PATENT DOCUMENTS

| | | |
|---|---|---|
| 0 173 902 | 3/1986 | European Pat. Off. . |
| 0 390 998 | 10/1990 | European Pat. Off. . |
| 0 522 270 | 1/1993 | European Pat. Off. . |
| 0 529 850 | 3/1993 | European Pat. Off. . |

*Primary Examiner*—Mark H. Paschall
*Attorney, Agent, or Firm*—Young & Thompson

[57] ABSTRACT

The plasma torch head comprises an axial electrode (10) with a flat end surface (16) associated with a cup-shaped peripheral nozzle (12). The bottom (20) of the nozzle (12) comprises an axial conduit (22) for ejection of the plasma jet, and its lateral wall (24) surrounds the electrode (10) and delimits with this latter a substantially annular supply space (26). The torch head comprises structure (38) for the flow of a plasmagenic gas in the annular supply space (26) in a substantially axial direction. The end surface (16) of the electrode (10) delimits with the bottom (20) of the nozzle (12) an annular space (29) for lamination of the flow of the plasmagenic gas. For use in plasma cutting torches.

11 Claims, 1 Drawing Sheet

SAF 95/172

SAF 95/172

PLASMA TORCH HEAD WITH NOZZLE PROVIDING AN IMPROVED CUT AND PLASMA TORCH INCLUDING THE SAME

BACKGROUND OF THE INVENTION

1. Field of the Invention

The present invention relates to a plasma torch head, of the type comprising an axial electrode with a flat end surface, associated with a cup-shaped peripheral nozzle whose bottom comprises an axial conduit for ejection of the plasma jet and whose lateral wall surrounds the electrode and delimits with this latter a substantially annular supply space. The invention also relates to a plasma torch.

2. Description of the Related Art

Such torch heads, provided with an electrode with a flat end surface, are used to create plasma jets from highly oxidizing plasmagenic gases such as oxygen. Thus, the electrodes having an end surface coming to a point and made for example of tungsten, volatilize under the effect of the highly oxidizing plasmagenic gas and under the effect of high temperature.

This problem is solved by using electrodes with a flat end surface at the center of which is provided an emissive insert for example of hafnium, flush with the surface of the latter.

However, the use of an electrode with a flat end surface gives rise to stabilization difficulties of the route of the electric arc adjacent the emissive insert.

So as to stabilize the latter, it is known to use a swirling distribution of gas in the annular space delimited by the electrode and the lateral wall of the nozzle. This swirling distribution of gas forms a gas vortex along the flow axis of the nozzle and hence in the region situated immediately upstream of the emissive insert, thereby creating by axial suction forces sufficient to maintain the route of the arc substantially stationary.

The plasma jet thus created has at the outlet of the torch head a movement of rotation about its longitudinal axis. During cutting of a workpiece, the rotational movement of the jet gives rise to dissymmetry of the shape of the kerf formed by the plasma jet. In particular, the flank angles and roughness are different on the two cut sides bordering the kerf.

This dissymmetry of the shape of the cut requires final mechanical working of the pieces thus cut, particularly by machining for their use in assemblies requiring relatively precise adjustments.

SUMMARY OF THE INVENTION

The present invention has for its object to provide a plasma torch head permitting obtaining cut shapes of good quality with flank angles that are substantially equal on opposite sides of the kerf, and not requiring routinely mechanical working of the cut workpieces prior to their ultimate use.

To this end, the invention has for its object a plasma torch head, of the recited type, characterized in that it comprises flow means for a plasmagenic gas in the annular supply space in a substantially axial direction, and in that the end surface of the electrode delimits with the bottom of the nozzle an annular space for lamination of the flow of the plasmagenic gas.

According to particular embodiments, the invention can have one or several of the following characteristics:

the area of the cylindrical cross section for passage of the gas in the annular lamination space, measured at the inlet of the axial ejection conduit, is less than one third of the area of the crown cross section for passage of the gas in the annular space surrounding the electrode;

the area of the cylindrical cross section for passage of the gas in the annular lamination space, measured at the inlet of the axial ejection conduit, is greater than 1/90th of the area of the crown cross section for passage of the gas in the annular space surrounding the electrode;

said flow means comprise supply openings for plasmagenic gas opening radially into the annular space;

the area of the crown cross section for passage of the gas in the annular space surrounding the electrode is greater than 1.5 times the total area of the cross section for passage of gas in the supply openings;

the area of the crown section for passage of the gas in the annular space surrounding the electrode is less than three times the total area of the cross section of the passage for gas in the supply openings;

the height e of the annular lamination space, expressed in centimeters, satisfies the inequality $$\frac{1}{5500}\ \frac{G}{\upsilon}\ \sqrt{\frac{1}{I}} \leqq e \leqq \frac{1}{3000}\ \frac{G}{\upsilon}\ \sqrt{\frac{1}{I}}$$

in which:

G is the flow rate of plasmagenic gas of the head, expressed in $cm^3.s^{-1}$,

ν is the kinematic viscosity of the plasmagenic gas, expressed in $cm^2.s^{-1}$, and I is the cutting current intensity, expressed in amperes;

the axial ejection conduit for the plasma jet provided in the torch comprises a cylindrical section of constant diameter for bringing the plasma flow to a laminar condition;

the axial ejection conduit of the plasma jet provided in the nozzle comprises at its inlet a section of progressively decreasing diameter in the direction of circulation of the plasma jet;

the inlet section is delimited by a toroidal surface connected tangentially to the lamination section;

the axial ejection conduit for the plasma jet provided in the nozzle comprises at its outlet a section of progressively increasing cross section in the direction of flow of the plasma jet, particularly having the shape of a Laval nozzle.

The invention also has for its object a plasma torch comprising a torch head, particularly interchangeable as a whole, as defined above.

BRIEF DESCRIPTION OF THE DRAWINGS

The invention will be better understood from a reading of the description which follows, given solely by way of example and with reference to the drawings, in which.

DESCRIPTION OF THE PREFERRED EMBODIMENT

Figure 1:
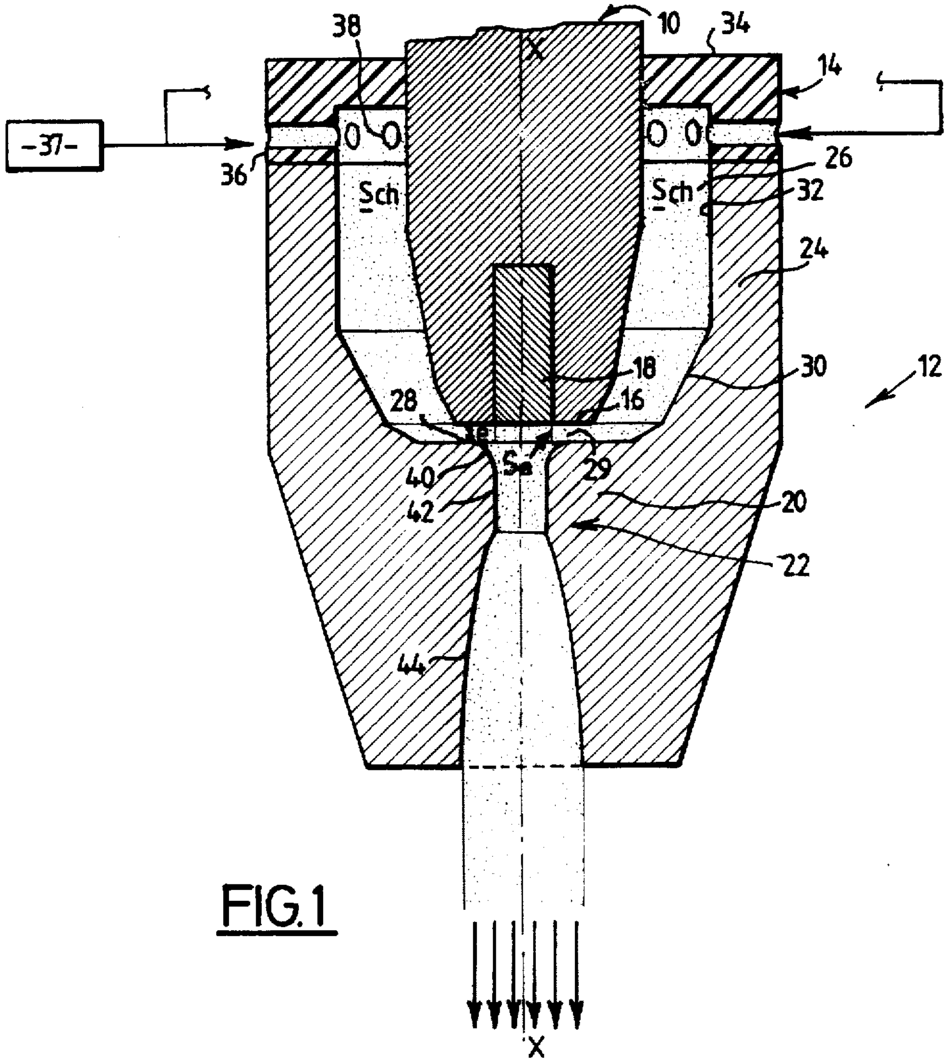
FIG. 1 is a very schematic view, in longitudinal cross section, of a plasma torch head according to the invention.

The plasma torch head shown in FIG. 1, adapted for cutting metallic workpieces, cannot be disassembled but is interchangeable and has a general shape of revolution about the axis X—X. It is mounted on a suitable plasma torch body, for example by snapping into this body. This head comprises essentially an electrode 10 on the axis X—X and a peripheral cup-shaped nozzle 12, both adapted to be associated with suitable electric current generators, and secured to an insulating cover 14 rigidly connected to the electrode and the nozzle, and forming a plasmagenic gas diffuser.

The electrode 10 is made of suitable metal and has a general shape of revolution. It comprises a flat end surface 16 extending perpendicularly to the axis X—X of the electrode, at an end of the latter with a slightly reduced diameter.

A cylindrical emissive insert 18 of hafnium is disposed axially at the end of the electrode 10 and is flush with the center of the surface 16.

The nozzle 12 has a cup-shape about axis X—X. It comprises a flat bottom 20 provided with an axial conduit 22 for ejection of the plasma jet. The bottom 20 is prolonged by a side wall 24 surrounding the electrode 10 and delimiting with the latter a substantially annular space 26 for the supply of plasmagenic gas.

The bottom 20 and the side wall 24 delimit a bowl within which is received the end of the electrode 10. The bottom of the bowl is comprised by a flat surface 28 disposed facing the flat surface 16. They delimit together an annular lamination space 29 for the flow of the plasmagenic gas. This space has a calibrated height designated e. The surface 28 is connected at its periphery to the side wall 24 by successive sections of conical or toroidal wall 30.

The internal cylindrical surface 32 of the side wall 24 and the cylindrical side surface of the electrode 10 delimit transversely of the annular supply space 26 a crown-shaped cross section for passage of the gas, whose area is designated $S_{ch}$.

The cover 14 has the general shape of an inverted cup whose bottom 34 is opposite the bottom of the torch 12. This bottom 34 is provided with a passage for the electrode 10. The side wall 36 of the cover 14 is secured to the side wall 24 of the torch in prolongation of the latter. The side wall 36 comprises moreover circular openings 38 entirely about the circumference, adapted to permit the passage into the annular space 26 of the plasmagenic gas from a source 37 under pressure. The openings 38 are arranged perpendicularly to the axis X—X of the electrode and regularly spaced about the periphery of the lateral wall. They permit the flow of plasmagenic gas into the annular space in a substantially axial direction and with a substantially homogeneous distribution of speeds about all the cross section $S_{ch}$. So as to permit stabilization of the electrical arc established between the emissive insert 18 and a metallic workpiece (not shown) disposed at the outlet of the ejection conduit 22, the height e of the annular lamination space 29, expressed in centimeters, is selected such that it responds substantially to the inequality:

$$\frac{1}{5500}\ \frac{G}{\nu}\ \sqrt{\frac{1}{I}} \leq e \leq \frac{1}{3000}\ \frac{G}{\nu}\ \sqrt{\frac{1}{I}}$$

in which:

G is the plasmagenic gas flow rate in the head, expressed in $cm^3.s^{-1}$.

ν is the kinematic viscosity of the plasmagenic gas, expressed in $cm^2\text{-}s^{-1}$, and I is the cutting current intensity, expressed in amperes.

Moreover, so that the annular lamination space defined between the flat facing surfaces 16 and 28 creates sufficient lamination of the plasmagenic gas to :maintain the route of the electric arc on the emissive surface 18, the dimensioning is such that the area, designated $S_e$, of the cylindrical section for passage of the gas in the annular laminating space 29, measured at the inlet of the plasma ejection conduit 22, is less than one third of the area $S_{ch}$ of the crown cross section for passage of gas in the annular space 26 surrounding the electrode 10.

However, so as to avoid a phenomenon of breakdown and the formation of an electrical arc between the electrode 10 and the bottom 20 of the nozzle, the height e is selected such that the same area $S_e$ is greater than 1/90th of the area $S_{ch}$.

Moreover, so as to limit disturbance at the outlet of the supply openings 38, and thus permit axial flow of the plasmagenic gas through the annular space 26, the area $S_{ch}$ is comprised between 1.5 and 3 times the total area of the cross section of the passage for the gas in the supply openings 38.

It will be seen that with such an arrangement, the flow of the plasmagenic gas takes place parallel to the axis X—X in the annular space 26, and thus permits the generation of forces converging on the axis X—X immediately upstream of the emissive insert 18 after lamination in the annular space 29. These convergent forces maintain the route of the electric arc in a substantially stationary condition. The stabilization of the arc is reinforced by the dynamic pressure of the plasma flow at the inlet of the ejection conduit 22.

The ejection conduit 22 comprises three successive coaxial sections. An inlet section 40, provided at the inlet of the ejection conduit 22, has a progressively decreasing diameter in the flow direction of plasma jet. This section 40 is prolonged by an intermediate section 42 of constant diameter adapted to bring the plasma flow to a laminar condition.

Figure 2:
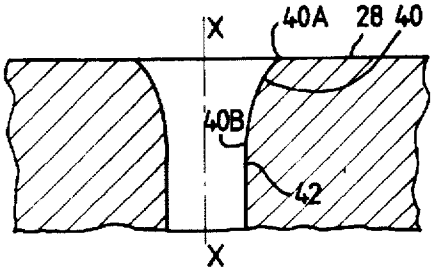
FIG. 2 is a longitudinal cross sectional view on a larger scale, of a detail of the torch of FIG. 1.

In FIG. 2 is shown on a greater scale the first portion of the injection conduit 22. In this figure, the inlet section 40 is delimited by a toroidal surface connected to the flat surface 28 by a sharp edge designated 40A. Moreover, this toroidal surface is connected tangentially at 40B to the intermediate section 42.

The conduit 22 comprises at its outlet a section 44 of progressively increasing cross section in the direction of flow of the plasma jet. This flared outlet section has the shape of a Laval nozzle so as progressively to bring the plasma jet to atmospheric pressure whilst accelerating it to bring its speed to supersonic speed. Moreover, the profile of the Laval nozzle permits at the outlet of the ejection conduit obtaining parallel gaseous flow lines and speeds substantially identical at all points of the transverse cross section of the jet.

So as to facilitate the production of the Laval nozzle, machining can be effected from a similar profile using for example cylinders, arcs of circles and conic sections connected to each other.

Such an ejection conduit 22 permits avoiding the deposit of particles extracted from the electrode in the inlet section 40. Moreover, the intermediate section 42 for laminating the plasma jet permits stabilizing the latter by establishment of a laminar regime.

A plasma torch head as described above permits maintaining substantially stationary the electric arc between the emissive insert 18 and the workpiece to be cut. Moreover, it is simple to make and does not require complex stabilization means for the electric arc. Moreover, no vortex being created along the path of the plasmagenic gas or of the plasma, the cut obtained has dimensional characteristics extremely close to those obtained by laser cutting.

By way of example, there is shown in the table below comparative results of cutting of a steel construction sheet E24 5 mm thick, with a conventional plasma torch head and with a plasma torch head according to the invention, both using oxygen as the plasmagenic gas.

| | Conventional Head | Head According to the Invention |
|---|---|---|
| Flank angle | 1 to 15° | 0° 10 min. to 0° 30 sec. |
| Roughness | $R_a \ngtr$ 50 μm | $R_a \ngtr$ 2 μm |
| Height of burr | $\ngtr$0.03 mm | $\ngtr$0.03 mm |

Experiments were conducted with a cutting current of 45 amperes, a relative supply pressure of 5.2 bars and a cutting speed of 0.82 m/mn.

Of course, the plasma torch head described above can comprise distribution devices for supplemental peripheral fluids for cooling or for protection of the central plasma jet from the influence of ambient air, or for modification of the chemical composition of this jet. It can also comprise conduits for circulation of a cooling fluid within the electrode and/or within the nozzle.

Moreover, the plasma torch head according to the invention can be made from a single prefabricated module and mounted by any suitable means on the appropriate torch body. The torch head is thus removable and interchangeable as a whole.

Similarly, the head can be integrated into a torch. In this case, the different members comprising the torch reproduce the dimensional characteristics of the head described above. Thus, for example, the cover 14 is integrated in the torch body and the electrode 10 and the nozzle 12 are screwed on or received within connectors of the torch body. Moreover, it is possible, in this case, that, during movement of the torch, the electrode 10, axially movably mounted, will come into contact with the torch 10 so as to strike an electric arc between them. The electrode is then automatically retracted and maintained spaced from the torch at the predetermined height e.

The torch head according to the invention can be dimensioned according to inequality (1) to operate with any type of plasmagenic gas, with oxygen or with air for example.

I claim:

1. A plasma torch head, comprising an axial electrode with a flat end surface within a peripheral cup-shaped nozzle whose bottom comprises an axial conduit for ejection of a plasma jet and whose side wall surrounds the electrode and delimits with the latter a substantially annular supply space, and means for the supply of a plasmagenic gas in the annular supply space in a substantially axial direction, the end surface of the electrode delimiting with the bottom of the nozzle an annular lamination space for flow of the plasmagenic gas, wherein a cross sectional area ($S_e$) of the cylindrical section of the gas passage in the annular lamination space, measured at the inlet of the axial ejection conduit, is less than one third of a cross sectional area ($S_{ch}$) of the section for passage of the gas in the annular supply space surrounding the electrode, measured at a widest part of the electrode within a widest part of the annular supply space.

2. Plasma torch head according to claim 1, wherein the area $S_e$ is greater than 1/60th of the area $S_{ch}$.

3. Plasma torch head according to claim 1, wherein said supply means comprise supply openings for plasmagenic gas opening radially into the annular space.

4. Plasma torch head according to claim 3, wherein the area $S_{ch}$ is greater than 1.5 times the total area of the section of the passage for gas in the supply openings.

5. Plasma torch head according to claim 3, wherein the area $S_{ch}$ is less than three times the total area of the section for passage of the gas in the supply openings.

6. Plasma torch head according to claim 1, wherein a height e of the annular lamination space, expressed in centimeters, is substantially determined by the inequality $$\frac{1}{5500}\ \frac{G}{\upsilon}\ \sqrt{\frac{1}{I}} \leqq e \leqq \frac{1}{3000}\ \frac{G}{\upsilon}\ \sqrt{\frac{1}{I}}$$

in which:

G is a flow rate of plasmagenic gas of the head, expressed in $cm^3.s^{-1}$,

ν is a kinematic viscosity of the plasmagenic gas, expressed in $cm^2.s^{-1}$, and I is a cutting current intensity, expressed in amperes.

7. Plasma torch head according to claim 1, wherein the axial conduit for ejection of the plasma jet provided in the nozzle comprises a cylindrical section of a constant diameter for bringing the plasma flow to a laminar condition.

8. Plasma torch head according to claim 1, wherein the axial conduit for ejection of the plasma jet provided in the torch comprises at its inlet a section of progressively decreasing diameter in the direction of flow of the plasma jet.

9. Plasma torch head according to claim 8, wherein the inlet section is delimited by a toroidal surface connected tangentially to the lamination section.

10. Plasma torch head according to claim 1, wherein the axial ejection conduit of the plasma jet provided in the nozzle comprises at its outlet a section of a cross section progressively increasing in the direction of flow of the plasma jet and having the shape of a Laval nozzle.

11. Plasma torch head, according to claim 1, wherein the torch head is designed such that it can be replaceably inserted into a plasma torch.

* * * * *